UNITED STATES PATENT OFFICE.

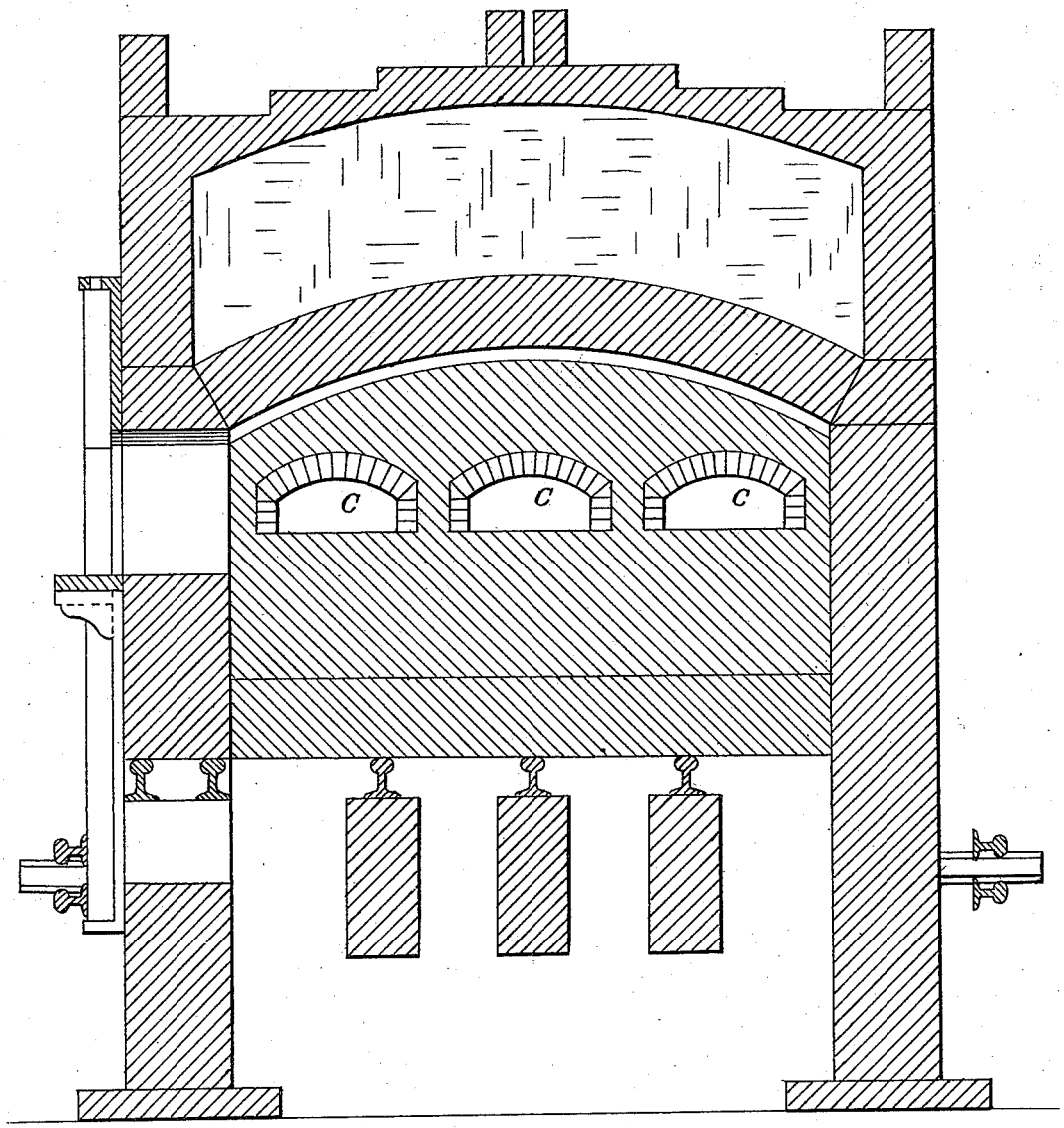

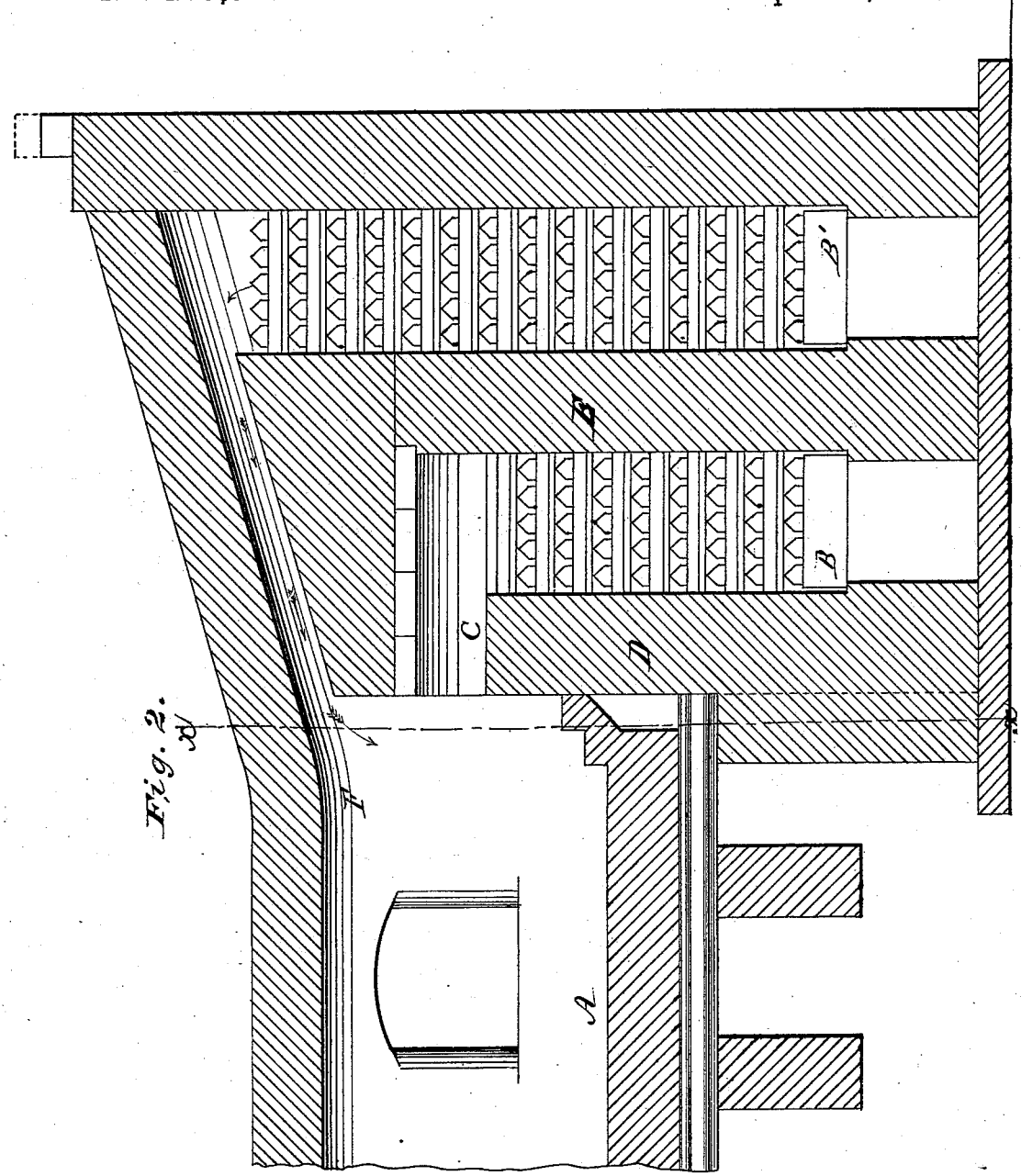

MARTIN V. SMITH, OF TYRONE, PENNSYLVANIA.

GLASS-FURNACE.

SPECIFICATION forming part of Letters Patent No. 285,316, dated September 18, 1883.

Application filed August 6, 1883. (No model.)

*To all whom it may concern:*

Be it known that I, MARTIN V. SMITH, a citizen of the United States, residing at Tyrone, in the county of Blair and State of Pennsylvania, have invented certain new and useful Improvements in Furnaces for Melting Glass, &c., of which the following is a specification, reference being had therein to the accompanying drawings.

My invention relates to improvements in furnaces for melting glass or metal, and for melting or heating other substances requiring intense heat; and to this end my invention consists in making the ports or flues which conduct the gas into the combustion or melting chamber of arc shape in cross-section, said arches being made of fire-brick or other refractory material, with keystones for interlocking and holding the same securely in position, as will more fully appear.

My invention also consists in extending the ports or flues above referred to from the combustion-chamber or melting-tank, or from the point at which the gas is ignited, back and on or into the wall or partition which separates the gas from the air-regenerators, and over the gas-regenerators.

My invention consists, further, in constructing the gas-ports wider than they are high, so that the gas will be injected into the combustion or melting chamber in wide sheets or waves, and thus be more evenly distributed throughout the furnace and a more complete combustion effected.

Figure 1 is a vertical sectional view at right angles to Fig. 2 and on the line *x x* of said figure. Fig. 2 is a vertical longitudinal section, showing one end of the furnace. The regenerators at the other end of the furnace are not shown.

In this class of furnaces as heretofore constructed the gas ports or flues have been covered with flat tiles of fire-brick or other suitable refractory material, placed on top of the flues to form the roof of the same. The objectionable feature of this construction is that under intense heat the tiles are liable to melt or soften, and by their own weight fall down, filling up the flue, thus necessitating a stoppage of work incident to making the requisite repairs. The gas-ports have also been made with their greatest length extending in a vertical line to the flame of the melting-tank or working-hearth, thus preventing an intimate admixture of the heated air with the gas, and a consequent loss of gas is the result produced by reason of an incomplete or imperfect combustion.

My invention is specially designed as an improvement in that class of glass-furnaces which have the regenerators above ground and inclosed under the same roof with the melting-tank or working-hearth, substantially such as described and claimed in Letters Patent granted to me November 7, 1882, No. 267,116, the gas and air flues, together with the valves for giving direction to the currents of gas and air, not being herein shown.

Referring to the drawings, A indicates the melting-tank, which may be of the ordinary or other convenient or desirable form, constructed of metal or other suitable supporting-base, lined with fire-brick or other refractory material. The melting-tank is supported by any suitable number of piers, so as to admit of a free circulation of air thereunder to keep it cool and prevent in a measure the rapid disintegration of the same by heat.

The regenerators B and B', of which the former, B, are for gas, and the latter, B', for air, are arranged in pairs at each end of the combustion-chamber. The regenerators are composed of the ordinary checker-work of fire-brick arranged in the ordinary manner, the brick which compose the checker-work being preferably beveled on their upper edges, so as to prevent the lodgment of soot and ashes, and the consequent stopping up or choking of the regenerators, and also to afford a greater heating-surface. The regenerators may vary in size, the smaller being for the passage of the gas and the larger for that of air, their proportions varying to correspond to the quantity of air or gas required to insure complete combustion in the melting and working chamber.

The regenerator-walls are or may be made of fire-brick or other refractory material, and are made gas-tight, so that no leakage may take place from one chamber to the other.

The regenerative compartments may be divided into several compartments by transverse partitions or diaphragms, such as described in an application for a patent filed by me May 21, 1883, Serial No. 95,596.

The checker-work of the air-regenerators extends up to or nearly to the arch of the combustion-chamber, thus greatly increasing the superficial area of the fire-brick composing the checker-work, and consequently increasing the heating capacity, and bringing the checker-work of both the gas and air regenerators above the level of the working-hearth, so that when the direction of the gas and air is reversed, as is common in this class of furnaces, the air will be more perfectly heated and a better combustion effected; and, furthermore, by extending the checker work of the air-flues above the point of entrance of the gas, the air is caused to enter the furnace above the gas, and, by reason of the superior specific gravity of the air and the inclined construction or arrangement of the arch of the furnace, tends to sink or be deflected through the gas, which enters the melting or combustion chamber in a horizontal direction, so that the air and gases become thoroughly intermixed and complete combustion is effected.

The description thus far is essentially the same as in my patent heretofore referred to.

I will now proceed to describe the improvements I have made and which I have found beneficial.

C C C are the gas ports or flues, through which the gas enters the combustion or melting chamber from the regenerator B. The tops of the ports or flues are made in the form of an arch, as shown, the arches being sustained at one end by the end wall, D, of the furnace, while the other end of the arch is supported on or in the partition-wall E, which separates the gas from the air regenerators, thus forming an arched gas-port which extends back to and over the gas-regenerators. By preference I construct these arches of fire-brick, with the usual key or locking brick, as is the custom in building arches; but I may mold the arches in position from mortar made of fire-clay or other highly-refractory material, as is the custom in making solid arches from hydraulic or other cement; or tiles of fire-clay having the proper curvature to form the arch may be used. The essential feature of this point of my invention is that by making the upper portion of the ports or flues C arch-shaped they are much less liable to give way to the action of expansion and contraction superinduced by the intense heat, and fall into the eye of the ports or into the gas-regenerator, as is frequently the case where the flat tiles are used as a covering or roof for the gas-ports. As a natural consequence, this portion of the furnace, which is most liable to be destroyed, is strengthened and the life of the furnace prolonged. The gas ports or flues are made flat and wide in a horizontal line or plane of the furnace, so that the gas enters the combustion or melting chamber in flat sheets or waves, and when the heated air which enters the combustion-chamber through the flue or port F from the air-regenerators B' comes in contact with the flat sheet or wave of gas, a more complete combustion is effected than would be the case where the gas-ports are made longer in a vertical direction, as is the ordinary practice.

Having thus described my invention, what I claim, and desire to secure by Letters Patent, is—

1. In a furnace for melting glass, &c., of the character described, the gas ports or flues which are arched on their upper surfaces or sides, and extend from the combustion-chamber back to and over the gas-regenerators, as and for the purpose set forth.

2. In a furnace for melting glass, &c., of the character described, the ports for the admission of gas or for air and gas, the crown of which is made in the form of an arch, whereby the rapid disintegration and collapsing of the ports by the intense heat is obviated.

3. A furnace for melting glass, &c., the gas-ports of which are made wider than they are high, the width being greatest in a longitudinal direction to the plane of the furnace, whereby the gas is introduced into the furnace in sheets or waves, as and for the purpose set forth.

4. In a furnace for melting glass, &c., the combination of the gas-ports, constructed substantially as described, with the air-ports F, as and for the purpose set forth.

In testimony whereof I affix my signature in presence of two witnesses.

MARTIN V. SMITH.

Witnesses:
D. T. CALDWELL,
H. M. MYERS.